Dec. 21, 1926.

F. G. HASSELBRING 1,611,746

GATE

Filed Oct. 7, 1922

WITNESS:
Arthur Hoffard
Harry Osborn

Fritz G. Hasselbring
INVENTOR

BY Victor J. Evans
ATTORNEY

Dec. 21, 1926.  
F. G. HASSELBRING  
GATE  
Filed Oct. 7, 1922  
1,611,746  
3 Sheets-Sheet 2
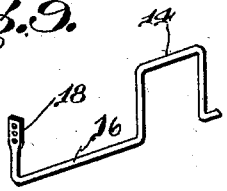
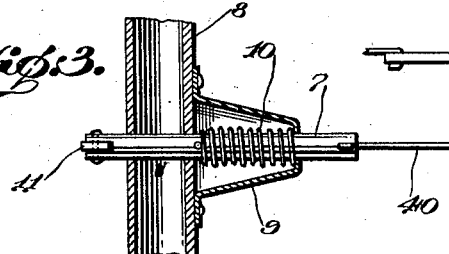
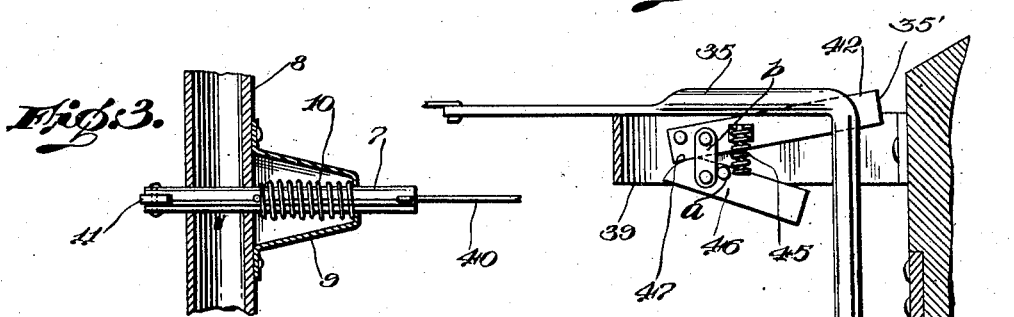
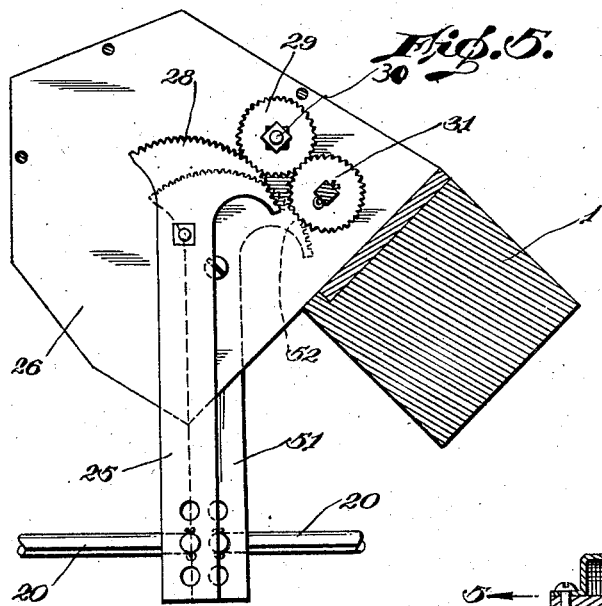
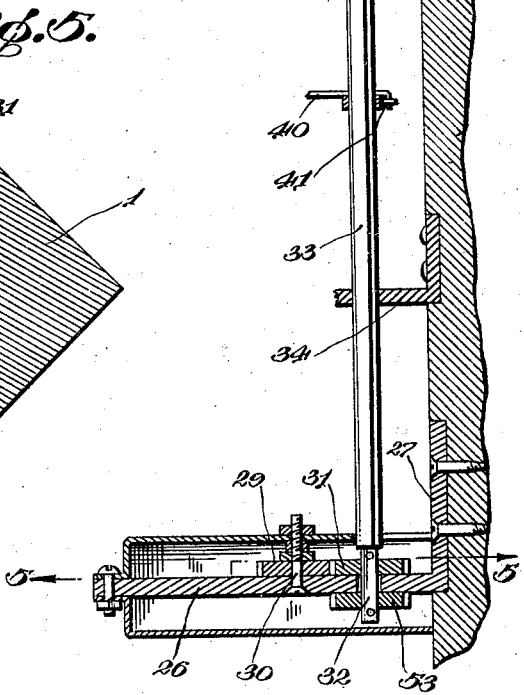
Fritz G. Hasselbring  
INVENTOR  
BY Victor J. Evans  
ATTORNEY Dec. 21, 1926.

F. G. HASSELBRING

GATE

Filed Oct. 7, 1922

Patented Dec. 21, 1926.

1,611,746

UNITED STATES PATENT OFFICE.

FRITZ G. HASSELBRING, OF CHARTER OAK, IOWA.

GATE.

Application filed October 7, 1922. Serial No. 593,074.

This invention relates to gates and more particularly to a gate and companion mechanism to permit the gate to be opened and closed by an approaching vehicle.

An object of the invention is to provide a mechanism applicable for attachment with an approved type of gate structure by means of which the gate will be swung open by an approaching vehicle and maintained in open position until the vehicle passes through the gate, after which the mechanism will be operated for closing the gate.

Another object of the invention is to provide a novel form of locking mechanism for locking the gate closed, which mechanism is released upon initial operation of the gate opening mechanism and also to provide a catch and release structure for holding the gate open and releasing the catch mechanism to permit the gate to be swung closed after the vehicle has passed therethrough.

Other objects of the invention will appear in the following detailed description taken in connection with the accompanying drawings wherein—

Fig. 1 is a side elevation of the improved gate and its operating mechanism.

Fig. 2 is a top plan of a gate and its operating mechanism.

Fig. 3 is a detailed section of the gate latch.

Fig. 4 is a fragmentary vertical section through the operating gate mechanism.

Fig. 5 is a horizontal sectional view on the line 5—5 of Fig. 4.

Fig. 9 is a detailed perspective view of one of the vehicle operated treads.

Figure 6:
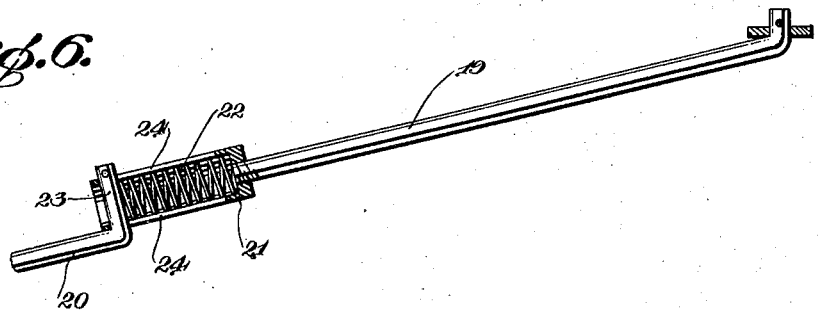
Fig. 6 is a detailed sectional view on the line 6—6 of Fig. 1.

Referring more particularly to the drawings the improved gate structure comprises the gate post 1 upon which the gate 2 is swingingly mounted by means of the supports 3. The gate 2 may be of any approved construction and it is held open by means of the latch 4 carried by the gate and cooperating with the keeper 5. The keeper 5 is in turn carried by the gate post 6. A similar keeper 5' is carried by the gate post 6' and cooperates with the latch 4 for holding the gate in closed position across the road way. The latch 4 comprises a rod 7 slidably carried by the free end 8 of the gate and a suitable housing 9. The spring 10 is coiled about the rod 7 and urges it into extended latching position. A roller 11 is rotatably carried by the outer end of the rod 7 for rolling engagement with the keeper 5 to permit the latch to pass the keeper and move into gate locking position. The gate is swung into open position by engagement of a vehicle approaching the gate with either of the treads 14 or 15. These treads 14 and 15 are formed upon rods 16 which are rockably supported by suitable guides 17. Each of the rods 16 is adjustably connected, by means of its flattened end 18, with a rod 19 which rod is in turn connected to a longitudinally movable operating rod 20. A yieldable connection between the operating rods 20 and the rods 19 is provided by means of the slotted cylinders 21 and the springs 22 mounted therein as shown in Fig. 6. The angled ends 23 of the operating rods 20 extend through the slots 24 in the cylinders 21 and are engaged by the springs 22 as clearly shown in Fig. 6 of the drawings. The operating rod 20, which extends from the left hand side of Figures 1 and 2 of the drawings, is connected to a lever 25 which is in turn pivotally supported by a supporting plate 26. The plate 26 is attached to the gate post 1 by suitable attaching portions 27 formed thereon. The lever 25 has an arcuate rack 28 upon its end remote from the end connected to the operating rod 20 which arcuate rack meshes with a gear 29. The gear 29 is rotatably supported by a suitable pin or bolt 30 and meshes with a gear 31 which is mounted upon the lower end 32 of the operating rod 33. The operating rod 33 extends vertically along the gate post 1 and is rotatably supported by suitable supporting brackets 34. The upper end of the operating rod 33 is bent horizontally as shown at 35 and the spring 36 is connected to the terminal of the horizontally bent end 35. A wire 37 is connected to the spring 36 and a collar 38 which is mounted upon the upper side of the gate 2 so that when the tread member 14 is depressed by an approaching vehicle the operating rod 20 will be moved longitudinally for rocking the lever 25 which will rotate the operating rod 33 and stretch the spring 36 moving the horizontal end 35 over the arcuate guide 39. The rotation of the rod 33 will withdraw the latch bolt 7 from behind the keeper 5 through the medium of the wire 40 and the arm 41. The arm 41 is carried by the rod 33 and the wire 40 is connected to this arm and to the bolt 7 for withdrawing the bolt upon rotation of the rod 33.

The rod 33 is alternately locked in either of its extreme positions through the medium of latch units 33' arranged on opposite sides 34' of the guide 39. Each of these units include a pivotally mounted lever 42 over which the angled end 35 is adapted to move and engage the end 35' thereof in which position the angled end 35 is locked against movement in an opposite direction. The angled end 35 is released from locking engagement with the end 35' through the medium of release arms 43 adjustably carried by a bracket 44 mounted upon the upper side of the gate 2. The lever 42 is urged into locking position by a spring 45 which also engages the release catch 46 and urges the rounded end 47 into engagement with a latch lever 42. It will be apparent from the foregoing description that one of the members 43, upon swinging of the gate in a direction induced by the spring member 36 under tension, will engage the inner end of the lever 46 rocking the same upon the pivot —a—. This rocking action of the lever 46 urges downward movement of the end 35' by reason of the connection therewith through the medium of the connecting link —b—. When the end 35' has reached its lowermost position the horizontal portion 35 will be released and permitted to return to its initial position as illustrated in Fig. 2 of the drawings, this movement of the portion 35 to its initial position being after a complete swinging movement of the gate in an open or closed position as the case may be.

Figure 7:
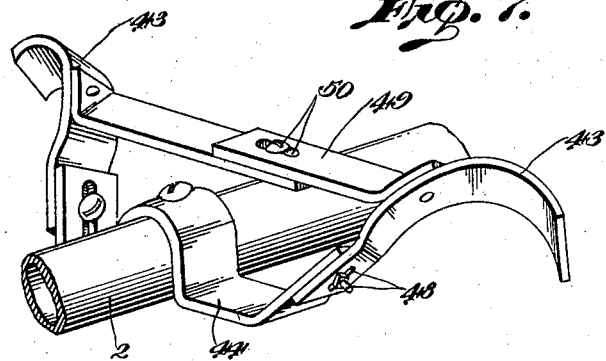
Fig. 7 is a detailed perspective view of the catch releasing members.
Figure 8:
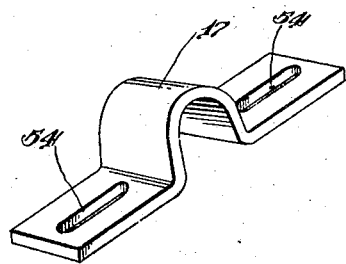
Fig. 8 is a detailed perspective view of a part of the gate structure.

The operation of the rod 33 and its associated parts is as follows:

When either of the treads 14 or 15 are depressed rotation is imparted to the operating rod 33, by reason of being operatively connected to the tread, and upon rotation of this rod, portion 35 will be moved along the lever 42 to a position to be locked against movement by this lever in an opposite direction. During movement of this lever the spring 36 is expanded. When the portion 35 reaches its locked position further rotation of the operating rod 33 will release the latch 4 from its keeper. The spring 36 at this point of the operation being under tension will induce swinging movement of the gate upon being released by the latch 4 and the gate will continue swinging movement until the latch 4 enters the other keeper opposite from the keeper from which it has just been released. As the gate swings from one position to the other, one of the members 43 will engage the lever 46 releasing the portion 35. After the gate has completed this swinging movement and after the portion 35 has been released, the tread operated upon will return to its initial position through the medium of the springs 55 and upon returning to its initial position will urge opposite rotation to the rod 33 returning the portion 35 to its initial position as illustrated in Fig. 4. As clearly shown in Fig. 7 of the drawing release members 43 are adjustably connected to the bracket 44 by means of slot and bolt constructions 48 and they are braced by brace bars 49 which are adjustably connected by slot and bolt connection 50.

The operating rod 20, which projects to the right in Figures 1 and 2 of the drawing, is adapted to be operated upon depression of the trip 15 and it is connected to a lever 51 which is in turn pivotally carried by the plate 26. The lever 51 has an arcuate rack 52 thereon which meshes with the gear 53 carried by the rectangular lower end 32 of the rod 33 so that depression of the tread 15 will rotate the rod 33 in the opposite direction to which it is rotated by depression of the trip 14 for swinging the gate into closed position or in the opposite direction from which it is swung by depression of the tread 14. The closing movement of the gate is caused by moving the trip 15 in the same direction in which the trip 14 is depressed and when a vehicle approaches the gate from the right the depression of the trip 15 will open the gate while the depression of the trip 14 will close the gate. The trip rod bearings 17 are provided with slots 54 to permit their adjustable connection to a suitable support. The operating rods 20 have springs 55 connected thereto for returning them to their normal positions which springs also return the threads 14 and 15 to their normal positions after operation.

It is, of course, to be understood that the invention may be constructed in various other manners and the parts associated in different relations and, therefore, I do not desire to be limited in any manner except as set forth in the claims hereunto appended.

Having thus described my invention, what I claim is:

1. The combination with a hinged gate, of tread members, a rockable operating rod, means establishing yieldable connection between the rod and the gate, means operable by the tread members for rocking the rod in a certain direction upon depression of the tread members to swing the gate, latch means adapted for engagement with the rod for releasably locking said rod against retroactive movement, and release members carried by the gate adapted for engagement with the latch means for releasing said rod upon final movement of the gate.

2. The combination with a hinged gate, of tread members, a rockable operating rod, means establishing yieldable connection between the rod and the gate, means operable by the tread members for rocking the rod in a certain direction upon depression of the tread members to swing the gate, latch means adapted for engagement with the rod for releasably locking the rod against retroactive movement, a latch structure for releasably locking the gate in closed position, means operatively connecting the rod to the latch structure for operating the latch structure to release the gate upon initial movement of the rod in said certain direction, and release members carried by the gate for movement therewith adapted for engagement with the latch means for operating the latch means to release the rod for retroactive movement upon final movement of the gate.

3. The combination with a gate structure, a hinged gate, an operating rod, means providing a yieldable connection between the rod and the gate for swinging the gate upon operation of the rod, gear members operatively connected to the rod, pivoted levers, arcuated racks carried by the pivoted levers and operatively meshing with the gear members, vehicle operated means for pivotally moving the levers to operate the operating rod in a certain direction, latch means adapted for engagement with the rod for releasably locking the rod against operation in retroactive direction, and release members carried by the gate adapted for engagement with the latch means for operating the latch means to release the rod for operation in said retroactive direction upon final movement of the gate.

4. The combination with spaced gate posts and a gate hingedly connected to one of the posts, of a latch structure releasably locking the gate to the other of the posts, depressable tread members spaced remotely on opposite sides of the gate, a rockable operating member, means providing a connection between the tread members and the operating member for rocking said member upon depressions of the tread members, a connection between the latch structure and the operating member for moving said latch structure to release said gate member from said other post upon initial movement of the operating member, an expansible member providing a connection between the operating member and the gate, said expansible member being adapted to be expanded upon initial movement of the operating member for imparting movement to the gate when released from the said other post, latch means adapted for engagement with the operating member to releasably hold the operating member against retroactive movement during operation of the expansible member when expanded to swing the gate, and means carried by the gate adapted for engagement with the latch means to move said latch means from engagement with the operating member upon final movement of the gate.

In testimony whereof I affix my signature.

FRITZ G. HASSELBRING.